(12) United States Patent
Wang et al.

(10) Patent No.: US 12,280,771 B2
(45) Date of Patent: Apr. 22, 2025

(54) VEHICLE TRAVELING CONTROL METHOD AND APPARATUS, DEVICE, AND STORAGE MEDIUM

(71) Applicant: Xiaomi EV Technology Co., Ltd., Beijing (CN)

(72) Inventors: Chao Wang, Beijing (CN); Chi Zhang, Beijing (CN)

(73) Assignee: Xiaomi EV Technology Co., Ltd., Beijing (CN)

( * ) Notice: Subject to any disclaimer, the term of this patent is extended or adjusted under 35 U.S.C. 154(b) by 341 days.

(21) Appl. No.: 17/864,030

(22) Filed: Jul. 13, 2022

(65) Prior Publication Data
US 2023/0303068 A1   Sep. 28, 2023

(30) Foreign Application Priority Data
Mar. 28, 2022   (CN) .......................... 202210314074.7

(51) Int. Cl.
*B60W 30/095*   (2012.01)
(52) U.S. Cl.
CPC ... *B60W 30/0956* (2013.01); *B60W 2520/105* (2013.01); *B60W 2554/804* (2020.02); *B60W 2556/10* (2020.02)
(58) Field of Classification Search
CPC ....... B60W 30/0956; B60W 2520/105; B60W 2554/804; B60W 2556/10;
(Continued)

(56) References Cited

U.S. PATENT DOCUMENTS

2017/0088136 A1*   3/2017   Seo .................. B60W 30/16
2020/0265710 A1*   8/2020   Zhan ............... B60W 60/00274
(Continued)

FOREIGN PATENT DOCUMENTS

CN   109582022 A   4/2019
CN   113076897 A   7/2021
(Continued)

OTHER PUBLICATIONS

Chinese Office Action issued on Jan. 19, 2023 for Chinese Patent Application No. 202210314074.7.
(Continued)

*Primary Examiner* — Jelani A Smith
*Assistant Examiner* — Alyssa Rorie
(74) *Attorney, Agent, or Firm* — Volpe Koenig (57) ABSTRACT

A vehicle traveling control method, includes: predicting traveling paths of candidate vehicles within the sensing range of a current vehicle; determining a target competing vehicle competing with the current vehicle from the candidate vehicles, where the target competing vehicle is a vehicle having a path intersection with the traveling path of the current vehicle; determining the traveling strategy combinations of the current vehicle and the target competing vehicle according to preset traveling variations and current traveling status of the current vehicle and the target competing vehicle; and determining a target traveling strategy combination that meets preset safe traveling conditions from the traveling strategy combinations, and controlling the traveling of the current vehicle according to the target traveling strategy combination.

20 Claims, 4 Drawing Sheets

(58) Field of Classification Search
CPC ..... B60W 2520/10; B60W 2554/4042; B60W 60/00276; B60W 30/0953; B60W 60/0027; B60W 60/001; B60W 2554/4045; Y02T 10/40
See application file for complete search history.

(56) References Cited

U.S. PATENT DOCUMENTS

| | | | |
|---|---|---|---|
| 2021/0188317 A1* | 6/2021 | Xia | B60W 60/0015 |
| 2021/0390225 A1 | 12/2021 | Yu et al. | |
| 2022/0126822 A1* | 4/2022 | Wang | B60W 50/0097 |
| 2022/0332313 A1* | 10/2022 | Abbruzzesi | B60W 30/0956 |
| 2023/0037367 A1* | 2/2023 | Qian | B60W 30/143 |
| 2023/0138704 A1* | 5/2023 | Liu | B60W 30/0953 |
| | | | 701/301 |
| 2023/0211776 A1* | 7/2023 | Yang | B60W 30/08 |
| | | | 701/23 |
| 2023/0222914 A1* | 7/2023 | Zhou | G08G 1/161 |
| 2023/0347940 A1* | 11/2023 | Longo | B60W 60/00274 |

FOREIGN PATENT DOCUMENTS

| | | |
|---|---|---|
| CN | 113160547 A | 7/2021 |
| CN | 113335282 A | 9/2021 |
| CN | 113947948 A | 1/2022 |
| DE | 102013005362 A1 | 10/2013 |

OTHER PUBLICATIONS

European Search Report issued on Jan. 2, 2023 for European Patent Application No. 22185219.7.

\* cited by examiner

VEHICLE TRAVELING CONTROL METHOD AND APPARATUS, DEVICE, AND STORAGE MEDIUM

CROSS REFERENCE TO RELATED APPLICATION

The present application claims the benefit of priority to Chinese Application No. 202210314074.7, filed on Mar. 28, 2022, the contents of which are incorporated herein by reference in their entireties for all purposes.

BACKGROUND

Automatic-driving vehicles usually sense traveling vehicles in other roads or road facilities in surroundings through vehicle-mounted sensors, and then formulate driving control strategies according to the positions of the traveling vehicles in the other roads or the positions of the road facilities. However, since the sensors can only sense the current positions of the traveling vehicles in the other roads, and cannot sense the future traveling intentions of the traveling vehicles in the other roads, the vehicles have the risk of collision.

SUMMARY

In order to overcome the problems existing in the related art, the disclosure provides a vehicle traveling control method and apparatus, a device, and a storage medium.

According to a first aspect of the examples of the disclosure, a vehicle traveling control method is provided, including:
  predicting traveling paths of candidate vehicles within the sensing range of a current vehicle;
  determining a target competing vehicle competing with the current vehicle from the candidate vehicles, where the target competing vehicle is a vehicle having a path intersection with the traveling path of the current vehicle;
  determining the traveling strategy combinations of the current vehicle and the target competing vehicle according to preset traveling variations and current traveling status of the current vehicle and the target competing vehicle, where each traveling strategy combination includes the traveling strategies of the current vehicle and the target competing vehicle on the respective traveling paths of the current vehicle and the target competing vehicle; and
  determining a target traveling strategy combination that meets preset safe traveling conditions from the traveling strategy combinations, and controlling the traveling of the current vehicle according to the target traveling strategy combination.

According to a second aspect of the examples of the disclosure, an electronic device is provided, including:
  a processor; and
  a memory for storing a processor executable instruction;
  the processor is configured to:
  predict traveling paths of candidate vehicles within the sensing range of a current vehicle;
  determine a target competing vehicle competing with the current vehicle from the candidate vehicles, wherein the target competing vehicle is a vehicle having a path intersection with the traveling path of the current vehicle;
  determine the traveling strategy combinations of the current vehicle and the target competing vehicle according to preset traveling variations and current traveling status of the current vehicle and the target competing vehicle, wherein each traveling strategy combination includes the traveling strategies of the current vehicle and the target competing vehicle on the respective traveling paths of the current vehicle and the target competing vehicle; and
  determine a target traveling strategy combination that meets preset safe traveling conditions from the traveling strategy combinations, and control the traveling of the current vehicle according to the target traveling strategy combination.

According to a third aspect of the examples of the disclosure, a computer-readable storage medium is provided, having stored thereon computer program instructions, wherein when the computer program instructions are executed by a processor, the processor is configured to:
  predict traveling paths of candidate vehicles within the sensing range of a current vehicle;
  determine a target competing vehicle competing with the current vehicle from the candidate vehicles, wherein the target competing vehicle is a vehicle having a path intersection with the traveling path of the current vehicle;
  determine the traveling strategy combinations of the current vehicle and the target competing vehicle according to preset traveling variations and current traveling status of the current vehicle and the target competing vehicle, wherein each traveling strategy combination comprises the traveling strategies of the current vehicle and the target competing vehicle on the respective traveling paths of the current vehicle and the target competing vehicle; and
  determine a target traveling strategy combination that meets preset safe traveling conditions from the traveling strategy combinations, and controlling the traveling of the current vehicle according to the target traveling strategy combination.

It should be understood that the above general descriptions and the following detailed descriptions are only exemplary and explanatory, and cannot limit the disclosure.

BRIEF DESCRIPTION OF THE FIGURES

The accompanying figures herein are incorporated into the specification and constitute a part of the specification, show examples consistent with the disclosure, and are used to explain the principle of the disclosure together with the specification.

DETAILED DESCRIPTION

Examples will be described in detail here, and the examples thereof are indicated in the drawings. When the following descriptions refer to the drawings, the same numbers in different drawings indicate the same or similar elements, unless otherwise indicated. The implementation manners described in the following examples do not represent all implementation manners consistent with the disclosure. Instead, they are merely examples of apparatuses and methods consistent with some aspects of the disclosure described as detailed in the appended claims.

It should be noted that all actions for acquiring signals, information or data in the application are carried out on the premise of complying with the corresponding data protection regulations and policies of the country where the application is located, and with the authorization of the corresponding apparatus owner.

The disclosure relates to the technical field of automatic driving, and in particular to a vehicle traveling control method and apparatus, a device, and a storage medium.

Automatic-driving vehicles usually sense traveling vehicles in other roads or road facilities in surroundings through vehicle-mounted sensors, and then formulate driving control strategies according to the positions of the traveling vehicles in the other roads or the positions of the road facilities. However, since the sensors can only sense the current positions of the traveling vehicles in the other roads, and cannot sense the future traveling intentions of the traveling vehicles in the other roads, the vehicles have the risk of collision.

In related scenarios, a partially observable Markov decision process (POMDP) is constructed according to the traveling status of the vehicle and the traveling status of the other vehicles, and then the traveling intentions of the other vehicles are determined according to solutions; however, the data amount is large in the traveling process, thus the calculation amount of the POMDP is large, and a long calculation time is caused and real-time online calculation can hardly be achieved, so vehicle traveling safety is low.

Figure 1:
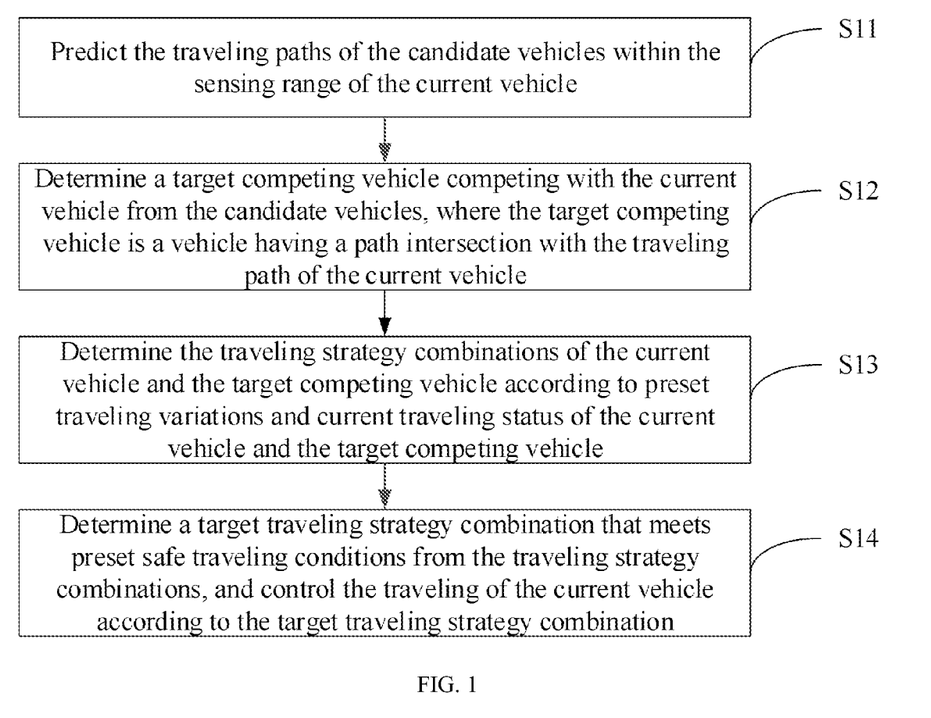
FIG. 1 is a flow chart of a vehicle traveling control method according to an example.

FIG. 1 is a flow chart of a vehicle traveling control method according to an example, and the method is applied to a vehicle-mounted controller, as shown in FIG. 1, the method including the following steps.

In step S11, the traveling paths of candidate vehicles within the sensing range of a current vehicle are predicted.

In the disclosure, the current vehicle is a vehicle configured with the vehicle-mounted controller for executing the current vehicle traveling control method of the disclosure, and the current vehicle needs to be configured with one or more radar sensors, one or more cameras and other sensing apparatuses to sense other vehicles within the surrounding range of the current vehicle.

The sensing range may be calibrated according to the traveling speed of the current vehicle, and the sensing range is positively correlated with the traveling speed of the current vehicle, that is, the higher the traveling speed of the current vehicle, the larger the sensing range. The sensing range in the extension direction of a road and that in a direction perpendicular to the extension direction of the road may be different, for example, the sensing range in the extension direction of the road is calibrated according to the traveling speed of the current vehicle, while the sensing range in the direction perpendicular to the extension direction of the road is determined according to the traveling lane, and the sensing range in the direction perpendicular to the extension direction of the road may cover all lanes in the traveling direction.

It may be understood that the candidate vehicles within the sensing range include vehicles in the traveling direction of the current vehicle and vehicles in opposite lanes of the current vehicle, so that the traveling paths of the vehicles traveling or parking temporarily in the opposite lanes are predicted. For example, the traveling paths of the vehicles parking temporarily or ready to turn left in the opposite lanes may be predicted in response to determining that the current vehicle is controlled to travel to a traffic light intersection.

In the examples of the disclosure, the traveling paths of the candidate vehicles include the traveling tracks of the candidate vehicles, traveling speeds at the track points of the traveling tracks, and time to travel to the track points.

In the examples of the disclosure, with regard to the candidate vehicles that go straight in the opposite lanes, areas between the current vehicle and the candidate vehicles may be taken as areas for predicting the traveling tracks of the candidate vehicles. The traveling lane of the current vehicle and the traveling lanes of the opposite candidate vehicles are mainly taken as the areas for predicting the traveling tracks of the candidate vehicles.

With regard to the candidate vehicles turning left in the opposite lanes, the left-turning waiting lane of the opposite lanes and a whole intersection in the traveling direction of the current vehicle may be taken as the areas for predicting the traveling tracks of the candidate vehicles.

On the basis of the above-mentioned examples, in the step, the predicating the traveling paths of candidate vehicles within the sensing range of a current vehicle includes:

acquiring the traveling speeds of the candidate vehicles within the sensing range of the current vehicle.

The candidate vehicles may include vehicles in the front and vehicles in the rear in the traveling direction of the current vehicle.

The corresponding predicted path lengths of the candidate vehicles are determined on the basis of the traveling speeds.

predicting traveling paths corresponding to the candidate vehicles within the predicted path lengths.

In the examples of the disclosure, with regard to the candidate vehicles in the same traveling direction as the current vehicle, the corresponding predicted path lengths may be determined by the traveling speeds of the candidate vehicles, and moreover, the predicted path lengths are positively correlated with the traveling speeds, that is, the higher the traveling speeds of the candidate vehicles, the larger the predicted path lengths of the candidate vehicles. Then, traveling tracks corresponding to the candidate vehicles, traveling speeds at track points of the traveling tracks, and time to travel to the track points are predicted within the predicted path lengths.

In step S12, a target competing vehicle competing with the current vehicle is determined from the candidate vehicles, and the target competing vehicle is a vehicle having a path intersection with the traveling path of the current vehicle.

In the examples of the disclosure, there may be one or more target competing vehicles.

In the step, the determining a target competing vehicle competing with the current vehicle from the candidate vehicles includes:

determining vehicles having path intersections with the traveling path of the current vehicle from the candidate vehicles to be candidate dangerous vehicles.

The current vehicle and the candidate vehicles travel at a uniform speed in the respective traveling paths according to the current traveling speed of the current vehicle and the current traveling speeds of the candidate vehicle, whether there are path intersections in the traveling paths of the current vehicle and the candidate vehicles or not is predicated, and if there are path intersections, the candidate vehicles are the candidate dangerous vehicles.

The candidate dangerous vehicles are grouped according to traveling lanes.

For example, the candidate dangerous vehicles may be grouped according to the current traveling lanes, and each lane is a vehicle group.

determining a target competing vehicle competing with the current vehicle from the candidate dangerous vehicles that are located in the forefront of the traveling direction of the traveling lane in each vehicle group.

In the examples of the disclosure, in the case of few vehicle groups, the candidate dangerous vehicle that is located in the forefront of the traveling direction of the traveling lane in each vehicle group may be determined to be one of the target competing vehicles competing with the current vehicle. In the case of many vehicle groups, the vehicle groups corresponding to the left traveling lane and the right traveling lane of the traveling lane of the current vehicle may be taken as target vehicle groups, and then the candidate dangerous vehicles that are located in the forefront of the traveling directions of the traveling lanes in the target vehicle groups are determined to be the target competing vehicles competing with the current vehicle.

Alternatively, the determining a target competing vehicle competing with the current vehicle from the candidate dangerous vehicles that are located in the forefront of the traveling direction of the traveling lane in each vehicle group includes:

predicting collision time points at which the candidate dangerous vehicles that are located in the forefront of the traveling direction of the traveling lane in each vehicle group collide with the current vehicle, according to the current traveling status of the current vehicle and the candidate dangerous vehicle.

In the examples of the disclosure, the current vehicle and the candidate dangerous vehicles travel at a uniform speed on the respective traveling paths according to the current traveling speed of the current vehicle and the current traveling speeds of the candidate dangerous vehicle, and collision time points at which the candidate dangerous vehicles that are located in the forefront of the traveling direction of the traveling lane in each vehicle group collide with the current vehicle are predicted.

determining the candidate dangerous vehicle that collides with the current vehicle first to be the target competing vehicle competing with the current vehicle according to the collision time points.

In the examples of the disclosure, lengths of time from the current time to the collision time points are determined according to the collision time points, and the vehicle with the shortest length of time is the candidate dangerous vehicle that collides with the current vehicle first.

In step S13, the traveling strategy combinations of the current vehicle and the target competing vehicle are determined according to preset traveling variations and the current traveling status of the current vehicle and the target competing vehicle.

Each traveling strategy combination includes the traveling strategies of the current vehicle and the target competing vehicle on the respective traveling paths of the current vehicle and the target competing vehicle.

In the examples of the disclosure, the preset traveling variations are a preset acceleration set, a plurality of accelerations are preset in the acceleration set, and there are at least one acceleration with a positive value and at least one acceleration with a negative value in the acceleration set, so that a plurality of the traveling strategies with regard to the current vehicle and the target competing vehicle may be combined on the basis of safety, traveling efficiency and traveling comfort.

In the examples of the disclosure, the current traveling status include the respective current traveling speeds of the vehicles and the traveling status of the target competing vehicle within the sensing range of the current vehicle, for example, the acceleration and deceleration information, lane change frequency information and the like of the target competing vehicle within the sensing range of the current vehicle.

The traveling strategies include traveling tracks of the vehicles on the respective traveling paths, and time and speeds to travel to the corresponding track points.

In step S14, a target traveling strategy combination that meets preset safe traveling conditions is determined from the traveling strategy combinations, and the traveling of the current vehicle is controlled according to the target traveling strategy combination.

In one implementation manner, the preset safe traveling conditions may be that the current vehicle and the target competing vehicle do not collide on the traveling paths, and moreover, the acceleration and deceleration frequency of the current vehicle and the target competing vehicle is the lowest, and the speed variations are the smallest. That there is no collision on the traveling paths may ensure the traveling safety of the vehicles, the lowest acceleration and deceleration frequency may ensure the riding comfort, and the smallest speed variations may ensure the passing efficiency of the vehicles.

Further, the traveling of the current vehicle may be controlled according to the traveling strategies of the current vehicle in the target traveling strategy combination, that is, the traveling of the current vehicle is controlled according to the accelerations of the current vehicle in the target traveling strategy combination, for example, in the target traveling strategy combination, the accelerations of the current vehicle at different track points in the traveling path are determined on the basis of the preset traveling variations, and then the traveling acceleration of the current vehicle may be controlled at the track points according to the accelerations.

According to the technical solutions, the traveling paths of candidate vehicles within the sensing range of a current vehicle are predicated; a target competing vehicle competing with the current vehicle is determined from the candidate vehicles, and the target competing vehicle is a vehicle having a path intersection with the traveling path of the current vehicle; the traveling strategy combinations of the current vehicle and the target competing vehicle are determined according to the current traveling states of the current vehicle and the target competing vehicle, and the preset traveling variations, and each traveling strategy combination includes the traveling strategies of the current vehicle and the target competing vehicle on the respective traveling paths of the current vehicle and the target competing vehicle; and a target traveling strategy combination that meets preset safe traveling conditions is determined from the traveling strategy combinations, and the traveling of the current vehicle is controlled according to the target traveling strategy combination. The current vehicle traveling safety can be improved by selecting the target competing vehicle from the candidate vehicles within the sensing range, determining the traveling strategy combinations of the current vehicle and the target competing vehicle, and then determining the target traveling strategy combination that meets the preset safe traveling conditions from the traveling strategy combinations.

Figure 2:
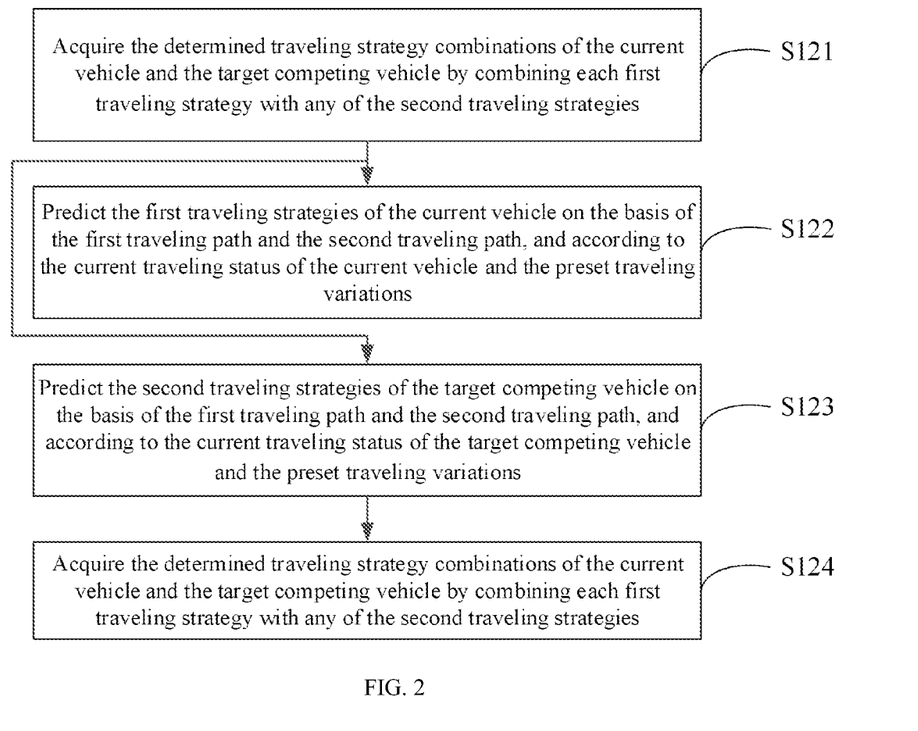
FIG. 2 is a flow chart for implementing step S12 in FIG. 1 according to an example.

On the basis of the above-mentioned examples, FIG. 2 shows a flow chart for implementing step S13 in FIG. 1 according to an example, in step S13, the determining the traveling strategy combinations of the current vehicle and the target competing vehicle according to preset traveling variations and the current traveling status of the current vehicle and the target competing vehicle includes:

in step S121, the respective traveling paths of the current vehicle and the target competing vehicle are divided into a first traveling path before the path intersection and a second traveling path after the path intersection separately.

In the examples of the disclosure, on the basis of a uniform-speed model, the current vehicle and the target competing vehicle travel at a uniform speed on the respective traveling paths according to the current traveling speed of the current vehicle and the current traveling speed of the target competing vehicle, the path intersection of the current vehicle and the target competing vehicle is predicted, the traveling path of the current vehicle is divided into a first traveling path before the path intersection and a second traveling path after the path intersection, and the traveling path of the target competing vehicle is also divided into a first traveling path before the path intersection and a second traveling path after the path intersection.

In step S122, the first traveling strategies of the current vehicle are predicted on the basis of the first traveling path and the second traveling path according to the current traveling status of the current vehicle and the preset traveling variations.

In the examples of the disclosure, a plurality of the preset traveling variations are included, thus there are a plurality of the predicted first traveling strategies of the current vehicle.

For example, the preset traveling variations of −1.5, 0 and 1.5 are taken as examples for description, according to the current traveling speed of the current vehicle, a first first traveling mode is obtained by taking −1.5 as the traveling variation in the first traveling path of the current vehicle and taking 0 as the traveling variation in the second traveling path of the current vehicle; according to the current traveling speed of the current vehicle, a second first traveling mode is obtained by taking −1.5 as the traveling variation in the first traveling path of the current vehicle and taking 1.5 as the traveling variation in the second traveling path of the current vehicle; according to the current traveling speed of the current vehicle, a third first traveling mode is obtained by taking 1.5 as the traveling variation in the first traveling path of the current vehicle and taking 0 as the traveling variation in the second traveling path of the current vehicle; according to the current traveling speed of the current vehicle, a fourth first traveling mode is obtained by taking 0 as the traveling variation in the first traveling path of the current vehicle and taking 1.5 as the traveling variation in the second traveling path of the current vehicle; according to the current traveling speed of the current vehicle, a fifth first traveling mode is obtained by taking 1.5 as the traveling variation in the first traveling path of the current vehicle and taking −1.5 as the traveling variation in the second traveling path of the current vehicle; and according to the current traveling speed of the current vehicle, a sixth first traveling mode is obtained by taking 0 as the traveling variation in the first traveling path of the current vehicle and taking −1.5 as the traveling variation in the second traveling path of the current vehicle. Time and speeds for the current vehicle to reach track points of first traveling modes are calculated according to the related formulas of the speeds, and discrete track points are obtained, and are taken as the first traveling strategies.

In step S123, the second traveling strategies of the target competing vehicle are predicted on the basis of the first traveling path and the second traveling path, and according to the current traveling state of the target competing vehicle and the preset traveling variations, where the traveling variations in the first traveling path are different from the traveling variations in the second traveling path.

Referring to the example of step S122, a plurality of the second traveling strategies may also be obtained with regard to the target competing vehicle, which will not be repeated here.

In step S124, the determined traveling strategy combinations of the current vehicle and the target competing vehicle are obtained by combining each first traveling strategy with any of the second traveling strategies.

In the examples of the disclosure, a plurality of the first traveling strategies are combined with a plurality of the second traveling strategies respectively, the above-mentioned examples are followed for description, and 36 traveling strategy combinations of the current vehicle and the target competing vehicle are obtained by combining the six first traveling strategies in step S122 with the six second traveling strategies in step S123 respectively.

According to the above-mentioned technical solutions, possible traveling strategies may be predicted through a plurality of different accelerations on the basis of the preset traveling variations, and then the traveling status of the two vehicles are accurately predicted, so that adjustment strategies are made in time.

On the basis of FIG. 1, in step S14, the determining a target traveling strategy combination that meets preset safe traveling conditions from the traveling strategy combinations includes:

calculating the corresponding average values of track accelerations of the second traveling strategies according to the historical acceleration of the target competing vehicle within the sensing range of the current vehicle and the corresponding traveling variations in the second traveling strategies.

For example, in a first second traveling strategy of taking −1.5 as the traveling variation in the first traveling path of the target competing vehicle and taking 0 as the traveling variation in the second traveling path, the corresponding average value of the historical acceleration and the track acceleration of −1.5 is calculated in the first traveling path, and the corresponding average value of the historical acceleration, the track acceleration of −1.5 and the track acceleration of 0 is calculated in the second traveling path. The average values of the track accelerations of the track points in the other second traveling strategies are the same, and will not be repeated here.

A target traveling strategy combination that meets preset safe traveling conditions is determined from the traveling strategy combinations according to a first-move right-of-way relationship between the current vehicle and the target competing vehicle, and the average values of the track accelerations.

The traveling direction of the target competing vehicle is determined according to the traveling lane of the target competing vehicle, and then the first-move right-of-way relationship of the target competing vehicle is determined according to the traveling direction of the target competing vehicle. The first-move right-of-way relationship includes a mode that the current vehicle is subjected to traveling control ahead of the target competing vehicle, a mode that the current vehicle and the target competing vehicle are subjected to traveling control in any order and allowed to travel, a mode that the current vehicle is subjected to traveling control behind the target competing vehicle, and a mode that the target competing vehicle is prohibited to pass.

For example, in response to determining that the current vehicle goes straight and the target competing vehicle turns left, the current vehicle is determined to be subjected to traveling control ahead of the target competing vehicle; when the current vehicle and the target competing vehicle both go straight, the current vehicle and the target competing vehicle are determined to be subjected to traveling control in any order and allowed to travel; when the current vehicle turns left and the target competing vehicle goes straight, the current vehicle is subjected to traveling control behind the target competing vehicle; and when the current vehicle is allowed to travel by green light and the target competing vehicle is prohibited to travel by red light, the target competing vehicle is prohibited to pass.

Alternatively, the determining a target traveling strategy combination that meets preset safe traveling conditions from the traveling strategy combinations according to a first-move right-of-way relationship between the current vehicle and the target competing vehicle, and the average values of the track accelerations includes:

determining the right-of-way acceleration of the target competing vehicle according to the first-move right-of-way relationship between the current vehicle and the target competing vehicle.

In the examples of the disclosure, the right-of-way level of the target competing vehicle is determined according to the first-move right-of-way relationship between the current vehicle and the target competing vehicle, and a preset acceleration of the right-of-way level is taken as the right-of-way acceleration of the target competing vehicle. Each right-of-way level is preset with the corresponding acceleration.

For example, when the first-move right-of-way relationship is that the current vehicle is subjected to traveling control after the target competing vehicle, the right-of-way level of the target competing vehicle is higher than the right-of-way level of the current vehicle, the preset acceleration of the right-of-way level is 0.75, and then the right-of-way acceleration of the target competing vehicle is 0.75; when the first-move right-of-way relationship is that the current vehicle and the target competing vehicle are subjected to traveling control in any order and allowed to travel, the right-of-way level of the target competing vehicle is equal to the right-of-way level of the current vehicle, the preset acceleration of the right-of-way level is 0, and then the right-of-way acceleration of the target competing vehicle is 0; when the first-move right-of-way relationship is that the current vehicle is subjected to traveling control ahead of the target competing vehicle, the right-of-way level of the target competing vehicle is lower than the right-of-way level of the current vehicle, the preset acceleration of the right-of-way level is −0.75, and then the right-of-way acceleration of the target competing vehicle is −0.75; and when the first-move right-of-way relationship is that the target competing vehicle is prohibited to pass, the right-of-way level is that the target competing vehicle has no right of way, the preset acceleration of the right-of-way level is −1.5, and then the right-of-way acceleration of the target competing vehicle is −1.5.

The corresponding acceleration weights of the second traveling strategies are determined according to observation times for the target competing vehicle within the sensing range of the current vehicle.

The more the observation times, the more the acceleration information that may be obtained, the higher the reliability, and the greater the acceleration weights.

Alternatively, the acceleration weight $k_i$ is calculated by the following formula:

$$k_i = \min\left[\log_2\left(\frac{a_{ki}}{n} + 1\right), 1\right]$$

$a_{ki}$ is the observation times for the historical acceleration of the $i_{th}$ second traveling track, n is a preset parameter, and the value of n may be 5, that is, when the observation times is greater than 5, the acceleration weight is no longer affected by the observation times.

Expected accelerations of the second traveling strategies are determined according to the right-of-way accelerations, the corresponding average values of the track accelerations of the second traveling strategies, and the acceleration weights.

Right-of-way acceleration weights are determined according to the acceleration weights, and then the expected accelerations of the second traveling strategies are determined according to the product of the average values of the track accelerations and the acceleration weights, and the product of the right-of-way acceleration weights and the right-of-way accelerations.

Alternatively, the expected acceleration $a_{ei}$ of the second traveling strategies may be determined by the following formula:

$$a_{ei}=k_i*a_{hi}+(1-k)*a_{ri}$$

$k_i$ is the corresponding acceleration weight of the average value of the track accelerations of the $i_{th}$ second traveling strategy, $a_{hi}$ is the average value of the track accelerations of the $i_{th}$ second traveling strategy, and $a_{ri}$ is the right-of-way acceleration of the $i_{th}$ second traveling strategy.

determining a target traveling strategy combination that meets preset safe traveling conditions from the traveling strategy combinations according to the average values of the track accelerations of the second traveling strategies, and the expected accelerations.

In the step, the determining a target traveling strategy combination that meets preset safe traveling conditions from the traveling strategy combinations according to the average values of the track accelerations of the second traveling strategies, and the expected accelerations includes:

calculating acceleration differences between the corresponding average values of the track accelerations of the second traveling strategies, and the expected accelerations.

In the examples of the disclosure, the acceleration differences between the corresponding average values of the track accelerations of the track points in the second traveling strategies, and the expected accelerations, may be calculated on the basis of the corresponding accelerations of the second traveling strategies on the first traveling path and the second traveling path, the accelerations being determined from the preset acceleration set, and the historical acceleration of the target competing vehicle after the target competing vehicle enters the sensing range of the current vehicle.

The corresponding track weights of the second traveling strategies in the traveling strategy combinations are determined according to preset acceleration adjustment parameters, the acceleration differences, and the corresponding minimum acceleration differences and maximum acceleration differences of the second traveling strategies.

Alternatively, the corresponding track weight $k_{wi}$, of the second traveling strategies in the traveling strategy combinations is calculated by the following formula:

$$k_{wi} = \frac{(\Delta a_i - \min\Delta a_i)*(1 - w_{min})}{(\max\Delta a_i - \min\Delta a_i)} + w_{min}$$

$\Delta a_i$ is the corresponding acceleration difference of the $i_{th}$ second traveling track, $\min\Delta a_i$ is the corresponding minimum acceleration difference in the $i_{th}$ second traveling track, $\max\Delta a_i$ is the corresponding maximum acceleration difference in the $i_{th}$ second traveling track, $W_{min}$ is a preset acceleration adjustment parameter, and the value of $W_{min}$ is (0, 1).

A target traveling strategy combination that meets preset safe traveling conditions is determined from the traveling strategy combinations according to the corresponding track weights of the second traveling strategies in the traveling strategy combinations, and intersection relationships between the second traveling tracks and the first traveling tracks in the traveling strategy combinations.

In the examples of the disclosure, a corresponding safety score value is determined according to whether there are track intersections between the second traveling tracks and the first traveling tracks or not; a comfort score value is determined according to the acceleration and deceleration frequency of the target competing vehicle in the second traveling tracks and the acceleration and deceleration frequency of the current vehicle in the first traveling tracks; and an efficiency score value is determined according to the traveling time lengths of the target competing vehicle in the second traveling tracks and the traveling time lengths of the current vehicle in the first traveling tracks. Whether the traveling strategy combinations meet the preset safe traveling conditions or not is determined according to the sum of the safety score value, the comfort score value and the efficiency score value, and the corresponding track weights of the second travelling strategies.

If there are no path intersections between the second traveling tracks and the first traveling tracks, it is indicated that the safety is high, and the safety score value is 0; and if there are path intersections between the second traveling tracks and the first traveling tracks, the safety score value is determined according to a preset safety coefficient and distances from the path intersections to the current vehicle.

The comfort score value is determined according to a preset safety coefficient, and target traveling variations which are determined correspondingly from preset traveling variations of the first traveling strategies and the second traveling strategies respectively.

The efficiency score value is determined according to a preset efficiency coefficient, and the traveling time lengths of the current vehicle within the traveling paths in the first traveling strategies and the traveling time lengths of the target competing vehicle within the traveling paths in the second traveling strategies respectively.

In the examples of the disclosure, when the current vehicle is determined not to yield according to a first target traveling track and a second target traveling track, the current vehicle is controlled not to yield, and for example, the current vehicle continues traveling uniformly at the current traveling speed. The first target traveling track is the traveling track corresponding to the first traveling strategies in the target traveling strategy combination, and the second target traveling track is the traveling track corresponding to the second traveling strategies in the target traveling strategy combination.

When the current vehicle is determined to yield according to the first target traveling track and the second target traveling track, traveling time for the current vehicle to reach the track intersection based on the first target traveling track is determined according to the track intersection of the second target traveling track and the first target traveling track, and the current vehicle is controlled to yield according to the traveling time and the corresponding acceleration of the first target traveling track.

Figure 3:
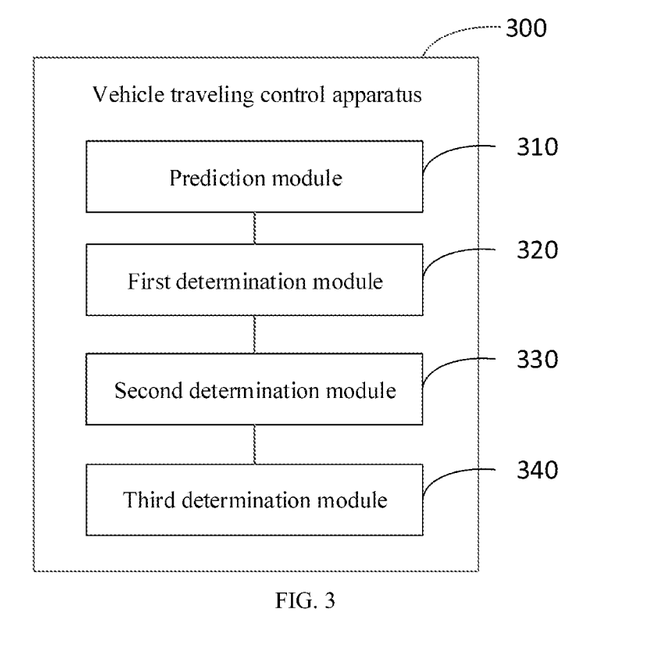
FIG. 3 is a block diagram of a vehicle traveling control apparatus according to an example.

On the basis of the same concept, the disclosure further provides a vehicle traveling control apparatus for executing part of or all of the steps of the vehicle traveling control method provided by the above-mentioned method examples. The apparatus 300 may implement the vehicle traveling control method in the form of software, hardware or a combination of the software and hardware. FIG. 3 is a block diagram of a vehicle traveling control apparatus according to an example, and referring to FIG. 3, the apparatus 300 includes:

a prediction module 310, configured to predict the traveling paths of candidate vehicles within the sensing range of a current vehicle;

a first determination module 320, configured to determine a target competing vehicle competing with the current vehicle from the candidate vehicles, where the target competing vehicle is a vehicle having a path intersection with the traveling path of the current vehicle;

a second determination module 330, configured to determine traveling strategy combinations of the current vehicle and the target competing vehicle according to preset traveling variations and current traveling status of the current vehicle and the target competing vehicle, where each traveling strategy combination includes the traveling strategies of the current vehicle and the target competing vehicle on the respective traveling paths of the current vehicle and the target competing vehicle; and a third determination module 340, configured to determine a target traveling strategy combination that meets preset safe traveling conditions from the traveling strategy combinations, and control the traveling of the current vehicle according to the target traveling strategy combination.

Alternatively, the second determination module 330 is configured to:

divide the respective traveling paths of the current vehicle and the target competing vehicle into a first traveling path before the path intersection and a second traveling path after the path intersection;

predict first traveling strategies of the current vehicle on the basis of the first traveling path and the second traveling path, and according to the current traveling status of the current vehicle and the preset traveling variations;

predict second traveling strategies of the target competing vehicle on the basis of the first traveling path and the second traveling path, and according to the current traveling status of the target competing vehicle and the preset traveling variations, where the traveling variations in the first traveling path are different from the traveling variations in the second traveling path; and obtain a determined traveling strategy combination of the current vehicle and the target competing vehicle by combining each first traveling strategy with any of the second traveling strategies.

Alternatively, the third determination module 340 is configured to:
calculate the corresponding average values of track accelerations of the track points in the second traveling strategies according to the historical acceleration of the target competing vehicle within the sensing range of the current vehicle and the corresponding traveling variations in the second traveling strategies; and
determine a target traveling strategy combination that meets preset safe traveling conditions from the traveling strategy combinations according to a first-move right-of-way relationship between the current vehicle and the target competing vehicle, and the average value of the track accelerations.

Alternatively, the third determination module 340 is configured to:
determine a right-of-way acceleration of the target competing vehicle according to the first-move right-of-way relationship between the current vehicle and the target competing vehicle;
determine corresponding acceleration weights of the second traveling strategies according to observation times for the target competing vehicle within the sensing range of the current vehicle;
determine expected accelerations of the track points in the second traveling strategies according to the right-of-way accelerations, the corresponding average values of the track accelerations of the second traveling strategies, and the acceleration weights; and
determine a target traveling strategy combination that meets preset safe traveling conditions from the traveling strategy combinations according to the average values of the track accelerations of the second traveling strategies, and the expected accelerations.

Alternatively, the third determination module 340 is configured to:
calculate acceleration differences between the corresponding average values of the track accelerations of the second traveling strategies, and the expected accelerations;
determine corresponding track weights of the second traveling strategies in the traveling strategy combinations according to preset acceleration adjustment parameters, the acceleration differences, and the corresponding minimum acceleration differences and maximum acceleration differences of the second traveling strategies; and
determine a target traveling strategy combination that meets preset safe traveling conditions from the traveling strategy combinations according to the corresponding track weights of the second traveling strategies in the traveling strategy combinations, and intersection relationships between the second traveling tracks and the first traveling tracks in the traveling strategy combinations.

Optionally, the first determination module 320 includes:
a first determination sub-module, configured to determine vehicles having path intersections with the traveling path of the current vehicle from the candidate vehicles to be candidate dangerous vehicles;
a grouping sub-module, configured to group the candidate dangerous vehicles according to traveling lanes; and
a second determination sub-module, configured to determine a target competing vehicle competing with the current vehicle from the candidate dangerous vehicles that are located in the forefront of the traveling direction of the traveling lane in each vehicle group.

Alternatively, the second determination sub-module 330 is configured to: predict collision time points at which the candidate dangerous vehicles that are located in the forefront of the traveling direction of the traveling lane in each vehicle group collide with the current vehicle, according to the current traveling status of the current vehicle and the candidate dangerous vehicle; and
determine the candidate dangerous vehicle that collides with the current vehicle first to be the target competing vehicle competing with the current vehicle according to the collision time points.

Alternatively, the prediction module 310 is configured to:
acquire the traveling speeds of the candidate vehicles within the sensing range of the current vehicle;
determine the corresponding predicted path lengths of the candidate vehicles on the basis of the traveling speeds; and
predict traveling paths corresponding to the candidate vehicles within the predicted path lengths.

With regard to the apparatus in the above-mentioned examples, the specific manners that the various modules execute operations have been described in detail in the examples relating to the method, and will not be described in detail here.

In addition, it is worth noting that, for the convenience and conciseness of the description, the examples described in the specification all belong to preferred examples, and the parts involved are not always necessary for the invention, for example, the prediction module 310 and the first determination module 320 may be mutually independent apparatuses or the same apparatus in specific implementation, which is not limited in the disclosure.

According to the examples of the disclosure, an electronic device is further provided, including:
a processor; and
a memory for storing a processor executable instruction;
the processor is configured to:
predict traveling paths of candidate vehicles within the sensing range of a current vehicle;
determine a target competing vehicle competing with the current vehicle from the candidate vehicles, where the target competing vehicle is a vehicle having a path intersection with the traveling path of the current vehicle;
determine the traveling strategy combinations of the current vehicle and the target competing vehicle according to preset traveling variations and current traveling status of the current vehicle and the target competing vehicle, where each traveling strategy combination includes the traveling strategies of the current vehicle and the target competing vehicle on the respective traveling paths of the current vehicle and the target competing vehicle; and
determine a target traveling strategy combination that meets preset safe traveling conditions from the traveling strategy combinations, and control the traveling of the current vehicle according to the target traveling strategy combination.

According to the examples of the disclosure, a computer-readable storage medium is further provided, having stored thereon computer program instructions and the steps of the current vehicle traveling control method provided by any one of the above-mentioned contents of the disclosure are implemented when the program instructions are executed by the processor.

Figure 4:
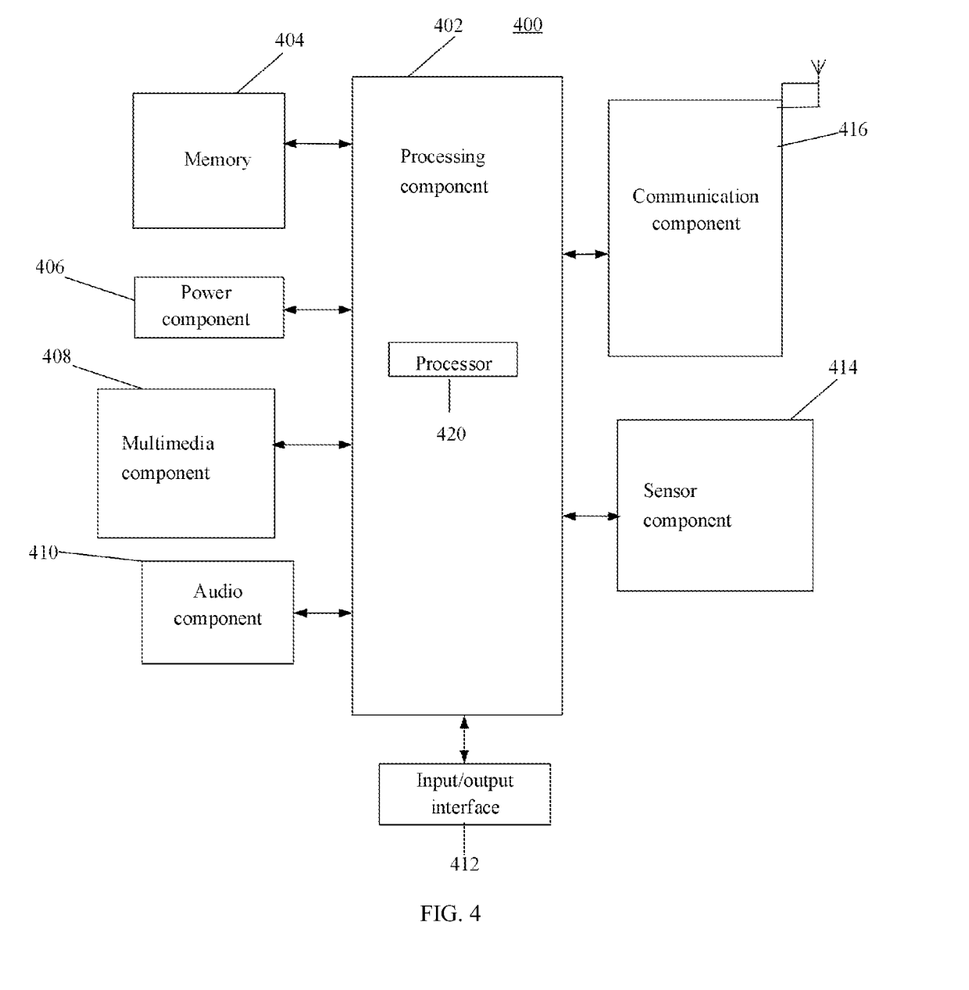
FIG. 4 is a block diagram of an apparatus for vehicle traveling control according to an example.

FIG. 4 is a block diagram of an apparatus 400 for vehicle traveling control according to an example. For example, the apparatus 400 may be configured to be an assistant driving system for a vehicle, which is used for implementing automatic driving and the like of the vehicle.

Referring to FIG. 4, the apparatus 400 may include one or more of the following components: a processing component 402, a memory 404, a power component 406, a multimedia component 408, an audio component 410, an input/output (I/O) interface 412, a sensor component 414, and a communication component 416.

The processing component 402 usually controls the overall operations of the apparatus 400, such as operations associated with display, telephone call, data communication, camera operation and recording operation. The processing component 402 may include one or more processors 420 to execute instructions, so as to complete all of or part of the steps of the above-mentioned vehicle traveling control method. In addition, the processing component 402 may include one or more modules to facilitate the interaction between the processing component 402 and other components. For example, the processing component 402 may include a multimedia module to facilitate interaction between the multimedia component 408 and the processing component 402.

The memory 404 is configured to store various types of data to support operations at the apparatus 400. Examples of these data include instructions for any application or method operated on the apparatus 400, contact data, phone book data, messages, pictures, videos, etc. The memory 404 may be implemented by any type of volatile or non-volatile storage device or a combination thereof, such as a static random access memory (SRAM), an electrically erasable programmable read-only memory (EEPROM), an erasable. programmable read-only memory (EPROM), a programmable read-only memory (PROM), a read-only memory (ROM), a magnetic memory, a flash memory, a magnetic disk or an optical disk.

The power component 406 supplies power to various components of the apparatus 400. The power component 406 may include a power management system, one or more power sources, and other components associated with power generation, management and distribution of the apparatus 400.

The multimedia component 408 includes a screen for providing an output interface between the apparatus 400 and the user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides and gestures on the touch panel. The touch sensor may sense not only the boundary of the touch or slide, but also the duration and pressure associated with the touch or slide. In some examples, the multimedia component 408 includes a front camera and/or a rear camera. When the apparatus 400 is in an operation mode, such as a shooting mode or a video mode, the front camera and/or the rear camera can receive external multimedia data. Each front or rear camera may be a fixed optical lens system or have focal length and optical zoom capability.

The audio component 410 is configured to output and/or input audio signals. For example, the audio component 410 includes a microphone (MIC), and when the apparatus 400 is in an operation mode, such as a call mode, a recording mode and a voice recognition mode, the microphone is configured to receive external audio signals. The received audio signals may be further stored in the memory 404 or sent by the communication component 416. In some examples, the audio component 410 further includes a speaker for outputting audio signals.

The I/O interface 412 provides an interface between the processing component 402 and a peripheral interface module, and the peripheral interface module may be a keyboard, a click wheel, a button and the like. The button may include but is not limited to a home button, a volume button, a start button and a lock button.

The sensor component 414 includes one or more sensors for providing various aspects of status assessment for the apparatus 400. For example, the sensor component 414 may detect the on/off state of the apparatus 400, and relative positions of components such as a display and a keypad of the apparatus 400. The sensor component 414 may also detect a position change of the apparatus 400 or one component of the apparatus 400, presence or absence of contact between the user and the apparatus 400, an orientation or acceleration/deceleration of the apparatus 400 and a temperature change of the apparatus 400. The sensor component 414 may include a proximity sensor configured to detect the presence of nearby objects without any physical contact. The sensor component 414 may also include an optical sensor, such as a CMOS or CCD image sensor, for use in imaging applications. In some examples, the sensor component 414 may also include an acceleration sensor, a gyroscope sensor, a magnetic sensor, a pressure sensor or a temperature sensor.

The communication component 416 is configured to facilitate wired communication or wireless communication between the apparatus 400 and other devices. The apparatus 400 may be accessed through a wireless network based on communication standards, such as WiFi, 2G, 3G, 4G or 5G, or the combinations thereof. In an example, the communication component 416 receives broadcast signals or broadcast associated information from an external broadcast management system via a broadcast channel. In an example, the communication component 416 further includes a near field communication (NFC) module to facilitate short-range communication. For example, the NFC module may be implemented based on radio frequency identification (RFID) technology, infrared data association (IrDA) technology, ultra wide band (UWB) technology, Bluetooth (BT) technology, and other technologies.

In the examples, the apparatus 400 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronic components, and is used for executing the above-mentioned vehicle traveling control method.

In the examples, a non-transitory computer-readable storage medium including instructions is further provided, such as a memory 404 including instructions, and the instructions can be executed by the processor 420 of the apparatus 400 to complete the above-mentioned vehicle traveling control method. For example, the non-transitory computer-readable storage medium may be a ROM, a random access memory (RAM), a CD-ROM, a magnetic tape, a floppy disk, an optical data storage device and the like.

In another example, a computer program product is further provided, which includes a computer program capable of being executed by a programmable apparatus, and the computer program has a code part for executing the above-mentioned vehicle traveling control method when the computer program is executed by the programmable apparatus.

A person skilled in the art would readily conceive of other implementation solutions of the disclosure after considering the specification and practicing the disclosure. The present application is intended to cover any variations, uses or adaptive changes of the disclosure. These variations, uses or adaptive changes follow the general principle of the disclosure and include common general knowledge or conventional technical means in the technical field that are not disclosed in the disclosure. The specification and the examples are merely regarded as exemplary, and the real scope and spirit of the disclosure are indicated by the following claims.

It should be understood that the disclosure is not limited to the precise structure described above and shown in the drawings, and various modifications and changes can be made without departing from its scope. The scope of the disclosure is only limited by the appended claims

What is claimed is:

1. A vehicle traveling control method, comprising:
   predicting traveling paths of candidate vehicles within a sensing range of a current vehicle;
      determining a target competing vehicle competing with the current vehicle from the candidate vehicles, wherein the target competing vehicle is a vehicle having a path intersection with a traveling path of the current vehicle;
      determining traveling strategy combinations of the current vehicle and the target competing vehicle according to preset traveling variations and current traveling status of the current vehicle and the target competing vehicle, wherein each traveling strategy combination comprises the traveling strategies of the current vehicle and the target competing vehicle on the respective traveling paths of the current vehicle and the target competing vehicle; and
      determining a target traveling strategy combination that meets preset safe traveling conditions from the traveling strategy combinations, and controlling the traveling of the current vehicle according to the target traveling strategy combination;
      wherein the preset traveling variations are a preset acceleration set, a plurality of accelerations are preset in the acceleration set;
      the respective traveling paths of the current vehicle and the target competing vehicle are divided into a first traveling path before the path intersection and a second traveling path after the path intersection separately;
      in any one of the target traveling strategy combination, the driving variation of the current vehicle within the first driving path is different from the driving variation within the second driving path, and the driving variation of the target competing within the first driving path is different from the driving variation within the second driving path.

2. The method according to claim 1, wherein the determining the traveling strategy combinations of the current vehicle and the target competing vehicle according to preset traveling variations and current traveling status of the current vehicle and the target competing vehicle comprises:
   predicting first traveling strategies of the current vehicle on the basis of the first traveling path and the second traveling path, and according to the current traveling status of the current vehicle and the preset traveling variations;
   predicting second traveling strategies of the target competing vehicle on the basis of the first traveling path and the second traveling path, and according to the current traveling status of the target competing vehicle and the preset traveling variations, and
   obtaining a determined traveling strategy combination of the current vehicle and the target competing vehicle by combining each first traveling strategy with any of the second traveling strategies.

3. The method according to claim 2, wherein the determining the target traveling strategy combination that meets preset safe traveling conditions from the traveling strategy combinations comprises:
   calculating corresponding average values of track accelerations of the second traveling strategies according to an historical acceleration of the target competing vehicle within the sensing range of the current vehicle and the corresponding traveling variations in the second traveling strategies; and
   determining the target traveling strategy combination that meets preset safe traveling conditions from the traveling strategy combinations according to a first-move right-of-way relationship between the current vehicle and the target competing vehicle, and the average value of the track accelerations.

4. The method according to claim 3, wherein the determining the target traveling strategy combination that meets preset safe traveling conditions from the traveling strategy combinations according to the first-move right-of-way relationship between the current vehicle and the target competing vehicle, and the average values of the track accelerations comprises:
   determining a right-of-way acceleration of the target competing vehicle according to the first-move right-of-way relationship between the current vehicle and the target competing vehicle;
   determining corresponding acceleration weights of the second traveling strategies according to observation times for the target competing vehicle within the sensing range of the current vehicle;
   determining expected accelerations of the second traveling strategies according to the right-of-way acceleration, the corresponding average values of the track accelerations of the second traveling strategies, and the acceleration weights; and
   determining a target traveling strategy combination that meets preset safe traveling conditions from the traveling strategy combinations according to the average values of the track accelerations of the second traveling strategies, and the expected accelerations.

5. The method according to claim 4, wherein the determining the target traveling strategy combination that meets preset safe traveling conditions from the traveling strategy combinations according to the average values of the track accelerations of the second traveling strategies, and the expected accelerations comprises:
   calculating acceleration differences between the corresponding average values of the track accelerations of the second traveling strategies, and the expected accelerations;
   determining corresponding track weights of the second traveling strategies in the traveling strategy combinations according to preset acceleration adjustment parameters, the acceleration differences, and the corresponding minimum acceleration differences and maximum acceleration differences of the second traveling strategies; and
   determining a target traveling strategy combination that meets preset safe traveling conditions from the traveling strategy combinations according to the corresponding track weights of the second traveling strategies in the traveling strategy combinations, and intersection relationships between second traveling tracks and first traveling tracks in the traveling strategy combinations.

6. The method according to claim 1, wherein the determining the target competing vehicle competing with the current vehicle from the candidate vehicles comprises:
determining vehicles having path intersections with the traveling path of the current vehicle from the candidate vehicles to be candidate dangerous vehicles;
grouping the candidate dangerous vehicles according to traveling lanes; and
determining a target competing vehicle competing with the current vehicle from the candidate dangerous vehicles that are located in a forefront of the traveling direction of the traveling lane in each vehicle group.

7. The method according to claim 6, wherein the determining the target competing vehicle competing with the current vehicle from the candidate dangerous vehicles that are located in the forefront of the traveling direction of the traveling lane in each vehicle group comprises:
predicting collision time points at which the candidate dangerous vehicles that are located in the forefront of the traveling direction of the traveling lane in each vehicle group collide with the current vehicle, according to the current traveling status of the current vehicle and the candidate dangerous vehicle; and
determining the candidate dangerous vehicle that collides with the current vehicle first to be the target competing vehicle competing with the current vehicle according to the collision time points.

8. The method according to claim 1, wherein the predicting traveling paths of candidate vehicles within the sensing range of the current vehicle comprises:
acquiring traveling speeds of the candidate vehicles within the sensing range of the current vehicle;
determining corresponding predicted path lengths of the candidate vehicles on the basis of the traveling speeds; and
predicting traveling paths corresponding to the candidate vehicles within the predicted path lengths.

9. An electronic device, comprising:
a processor; and
a memory for storing a processor executable instruction;
the processor is configured to:
predict traveling paths of candidate vehicles within a sensing range of a current vehicle;
determine a target competing vehicle competing with the current vehicle from the candidate vehicles, wherein the target competing vehicle is a vehicle having a path intersection with the traveling path of the current vehicle;
determine the traveling strategy combinations of the current vehicle and the target competing vehicle according to preset traveling variations and current traveling status of the current vehicle and the target competing vehicle, wherein each traveling strategy combination comprises the traveling strategies of the current vehicle and the target competing vehicle on the respective traveling paths of the current vehicle and the target competing vehicle; and
determine a target traveling strategy combination that meets preset safe traveling conditions from the traveling strategy combinations, and controlling the traveling of the current vehicle according to the target traveling strategy combination;
wherein the preset traveling variations are a preset acceleration set, a plurality of accelerations are preset in the acceleration set;
the respective traveling paths of the current vehicle and the target competing vehicle are divided into a first traveling path before the path intersection and a second traveling path after the path intersection separately;
in any one of the target traveling strategy combination, the driving variation of the current vehicle within the first driving path is different from the driving variation within the second driving path, and the driving variation of the target competing within the first driving path is different from the driving variation within the second driving path.

10. The electronic device according to claim 9, wherein the determine the traveling strategy combinations of the current vehicle and the target competing vehicle according to preset traveling variations and current traveling status of the current vehicle and the target competing vehicle comprises:
predict first traveling strategies of the current vehicle on the basis of the first traveling path and the second traveling path, and according to the current traveling status of the current vehicle and the preset traveling variations;
predict second traveling strategies of the target competing vehicle on the basis of the first traveling path and the second traveling path, and according to the current traveling status of the target competing vehicle and the preset traveling variations; and
obtain a determined traveling strategy combination of the current vehicle and the target competing vehicle by combining each first traveling strategy with any of the second traveling strategies.

11. The electronic device according to claim 10, wherein the determine the target traveling strategy combination that meets preset safe traveling conditions from the traveling strategy combinations comprises:
calculate corresponding average values of track accelerations of the second traveling strategies according to an historical acceleration of the target competing vehicle within the sensing range of the current vehicle and the corresponding traveling variations in the second traveling strategies; and
determine a target traveling strategy combination that meets preset safe traveling conditions from the traveling strategy combinations according to a first-move right-of-way relationship between the current vehicle and the target competing vehicle, and the average value of the track accelerations.

12. The electronic device according to claim 11, wherein the determine the target traveling strategy combination that meets preset safe traveling conditions from the traveling strategy combinations according to the first-move right-of-way relationship between the current vehicle and the target competing vehicle, and the average values of the track accelerations comprises:
determine a right-of-way acceleration of the target competing vehicle according to the first-move right-of-way relationship between the current vehicle and the target competing vehicle;
determine corresponding acceleration weights of the second traveling strategies according to observation times for the target competing vehicle within the sensing range of the current vehicle;
determine expected accelerations of the second traveling strategies according to the right-of-way acceleration, the corresponding average values of the track accelerations of the second traveling strategies, and the acceleration weights; and determine a target traveling strategy combination that meets preset safe traveling conditions from the traveling strategy combinations according to the average values of the track accelerations of the second traveling strategies, and the expected accelerations.

13. The electronic device according to claim 12, wherein the determine the target traveling strategy combination that meets preset safe traveling conditions from the traveling strategy combinations according to the average values of the track accelerations of the second traveling strategies, and the expected accelerations comprises:

calculate acceleration differences between the corresponding average values of the track accelerations of the second traveling strategies, and the expected accelerations;

determine corresponding track weights of the second traveling strategies in the traveling strategy combinations according to preset acceleration adjustment parameters, the acceleration differences, and the corresponding minimum acceleration differences and maximum acceleration differences of the second traveling strategies; and determine a target traveling strategy combination that meets preset safe traveling conditions from the traveling strategy combinations according to the corresponding track weights of the second traveling strategies in the traveling strategy combinations, and intersection relationships between second traveling tracks and first traveling tracks in the traveling strategy combinations.

14. The electronic device according to claim 9, wherein the determine the target competing vehicle competing with the current vehicle from the candidate vehicles comprises:

determine vehicles having path intersections with the traveling path of the current vehicle from the candidate vehicles to be candidate dangerous vehicles; group the candidate dangerous vehicles according to traveling lanes; and determine a target competing vehicle competing with the current vehicle from the candidate dangerous vehicles that are located in a forefront of the traveling direction of the traveling lane in each vehicle group.

15. The electronic device according to claim 14, wherein the determine the target competing vehicle competing with the current vehicle from the candidate dangerous vehicles that are located in the forefront of the traveling direction of the traveling lane in each vehicle group comprises:

predict collision time points at which the candidate dangerous vehicles that are located in the forefront of the traveling direction of the traveling lane in each vehicle group collide with the current vehicle, according to the current traveling status of the current vehicle and the candidate dangerous vehicle; and determine the candidate dangerous vehicle that collides with the current vehicle first to be the target competing vehicle competing with the current vehicle according to the collision time points.

16. The electronic device according to claim 9, wherein the predict traveling paths of candidate vehicles within the sensing range of the current vehicle comprises:

acquire traveling speeds of the candidate vehicles within the sensing range of the current vehicle;

determine the corresponding predicted path lengths of the candidate vehicles on the basis of the traveling speeds; and predict traveling paths corresponding to the candidate vehicles within the predicted path lengths.

17. A non-transitory computer-readable storage medium, having stored thereon computer program instructions, wherein when the computer program instructions are executed by a processor, the processor is configured to:

predict traveling paths of candidate vehicles within a sensing range of a current vehicle;

determine a target competing vehicle competing with the current vehicle from the candidate vehicles, wherein the target competing vehicle is a vehicle having a path intersection with the traveling path of the current vehicle;

determine the traveling strategy combinations of the current vehicle and the target competing vehicle according to preset traveling variations and current traveling status of the current vehicle and the target competing vehicle, wherein each traveling strategy combination comprises the traveling strategies of the current vehicle and the target competing vehicle on the respective traveling paths of the current vehicle and the target competing vehicle; and determine a target traveling strategy combination that meets preset safe traveling conditions from the traveling strategy combinations, and controlling the traveling of the current vehicle according to the target traveling strategy combination;

wherein the preset traveling variations are a preset acceleration set, a plurality of accelerations are preset in the acceleration set;

the respective traveling paths of the current vehicle and the target competing vehicle are divided into a first traveling path before the path intersection and a second traveling path after the path intersection separately;

in any one of the target traveling strategy combination, the driving variation of the current vehicle within the first driving path is different from the driving variation within the second driving path, and the driving variation of the target competing within the first driving path is different from the driving variation within the second driving path.

18. The non-transitory computer-readable storage medium according to claim 17, wherein the determine the traveling strategy combinations of the current vehicle and the target competing vehicle according to preset traveling variations and current traveling status of the current vehicle and the target competing vehicle comprises: divide the respective traveling paths of the current vehicle and the target competing vehicle into a first traveling path before the path intersection and a second traveling path after the path intersection;

predict first traveling strategies of the current vehicle on the basis of the first traveling path and the second traveling path, and according to the current traveling status of the current vehicle and the preset traveling variations;

predict second traveling strategies of the target competing vehicle on the basis of the first traveling path and the second traveling path, and according to the current traveling status of the target competing vehicle and the preset traveling variations, wherein the traveling variations in the first traveling path are different from the traveling variations in the second traveling path; and obtain a determined traveling strategy combination of the current vehicle and the target competing vehicle by combining each first traveling strategy with any of the second traveling strategies.

19. The non-transitory computer-readable storage medium according to claim 18, wherein the determine the target traveling strategy combination that meets preset safe traveling conditions from the traveling strategy combinations comprises:

calculate corresponding average values of track accelerations of the second traveling strategies according to an historical acceleration of the target competing vehicle within the sensing range of the current vehicle and the corresponding traveling variations in the second traveling strategies; and determine a target traveling strategy combination that meets preset safe traveling conditions from the traveling strategy combinations according to a first-move right-of-way relationship between the current vehicle and the target competing vehicle, and the average value of the track accelerations.

20. The non-transitory computer-readable storage medium according to claim 19, wherein the determine the target traveling strategy combination that meets preset safe traveling conditions from the traveling strategy combinations according to the first-move right-of-way relationship between the current vehicle and the target competing vehicle, and the average values of the track accelerations comprises:

determine a right-of-way acceleration of the target competing vehicle according to the first-move right-of-way relationship between the current vehicle and the target competing vehicle;

determine corresponding acceleration weights of the second traveling strategies according to observation times for the target competing vehicle within the sensing range of the current vehicle;

determine expected accelerations of the second traveling strategies according to the right-of-way acceleration, the corresponding average values of the track accelerations of the second traveling strategies, and the acceleration weights; and determine a target traveling strategy combination that meets preset safe traveling conditions from the traveling strategy combinations according to the average values of the track accelerations of the second traveling strategies, and the expected accelerations.

* * * * *

UNITED STATES PATENT AND TRADEMARK OFFICE
CERTIFICATE OF CORRECTION

PATENT NO. : 12,280,771 B2
APPLICATION NO. : 17/864030
DATED : April 22, 2025
INVENTOR(S) : Chao Wang et al.

Page 1 of 1

It is certified that error appears in the above-identified patent and that said Letters Patent is hereby corrected as shown below:

In the Specification
In Column 4, Line 23, delete "predicating" and insert -- predicting --, therefor.
In Column 4, Line 33, delete "predicting" and insert -- Predicting --, therefor.
In Column 4, Lines 65-66, delete "predicated," and insert -- predicted, --, therefor.
In Column 5, Line 6, delete "determining" and insert -- Determining --, therefor.
In Column 5, Line 44, delete "determining" and insert -- Determining --, therefor.
In Column 6, Line 47, delete "predicated;" and insert -- predicted; --, therefor.
In Column 7, Line 11, delete "in step" and insert -- In step --, therefor.
In Column 7, Line 38, delete "a first first" and insert -- a first --, therefor.
In Column 10, Line 39, delete "determining" and insert -- Determining --, therefor.
In Column 11, Line 1, delete "kwi," and insert -- kwi --, therefor.
In Column 15, Line 17, delete "all of or part" and insert -- all or part --, therefor.
In Column 17, Line 17, delete "claims" and insert -- claims. --, therefor.

In the Claims
In Column 18, Line 3, in Claim 2, delete "variations, and" and insert -- variations; and --, therefor.

Signed and Sealed this
Fifteenth Day of July, 2025

Coke Morgan Stewart
*Acting Director of the United States Patent and Trademark Office*